5 Sheets—Sheet 1.
L. BINNS.
Machine for Manufacturing Bands, Cords or Ropes.
No. 209,106. Patented Oct. 22, 1878.
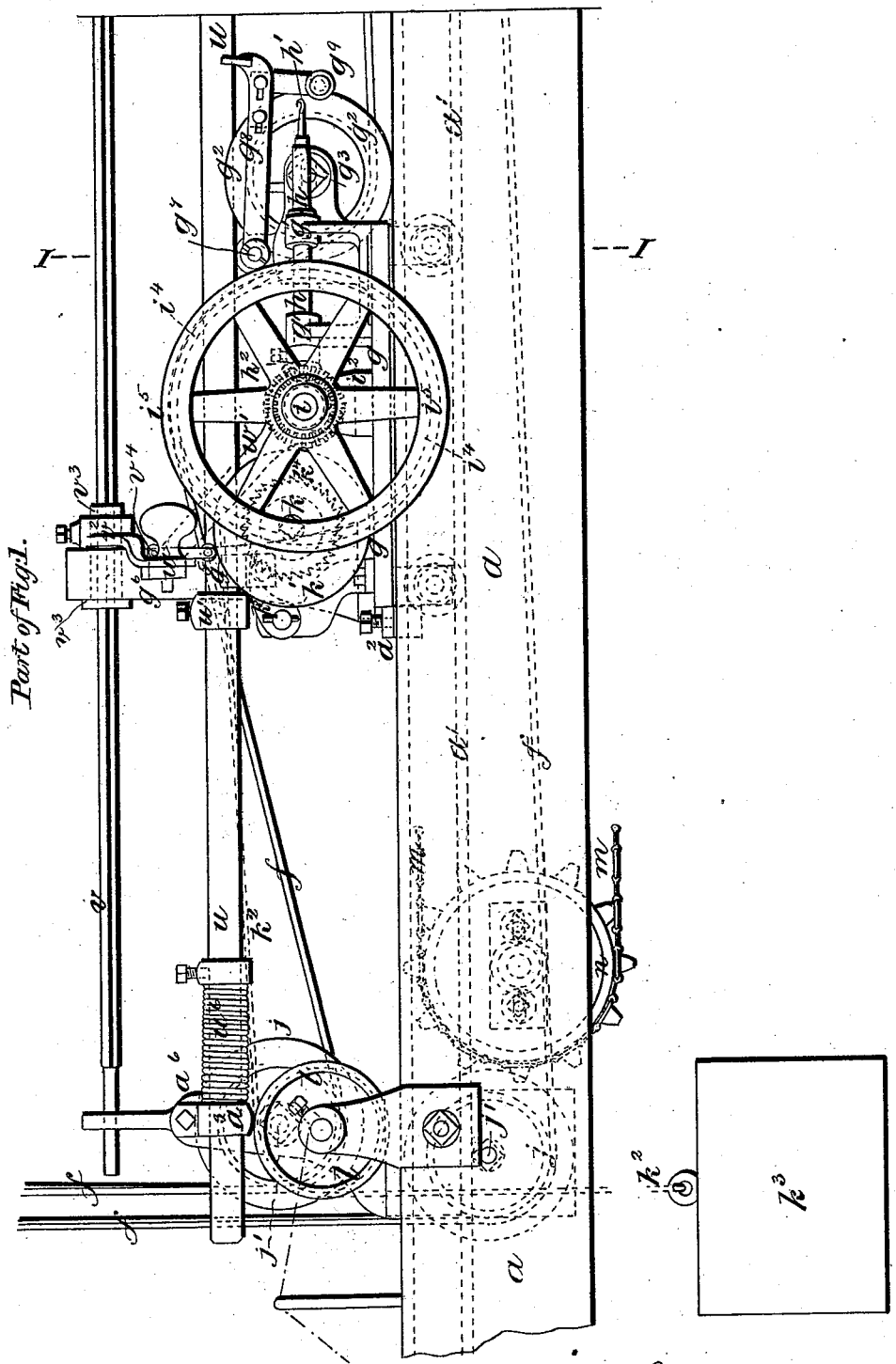

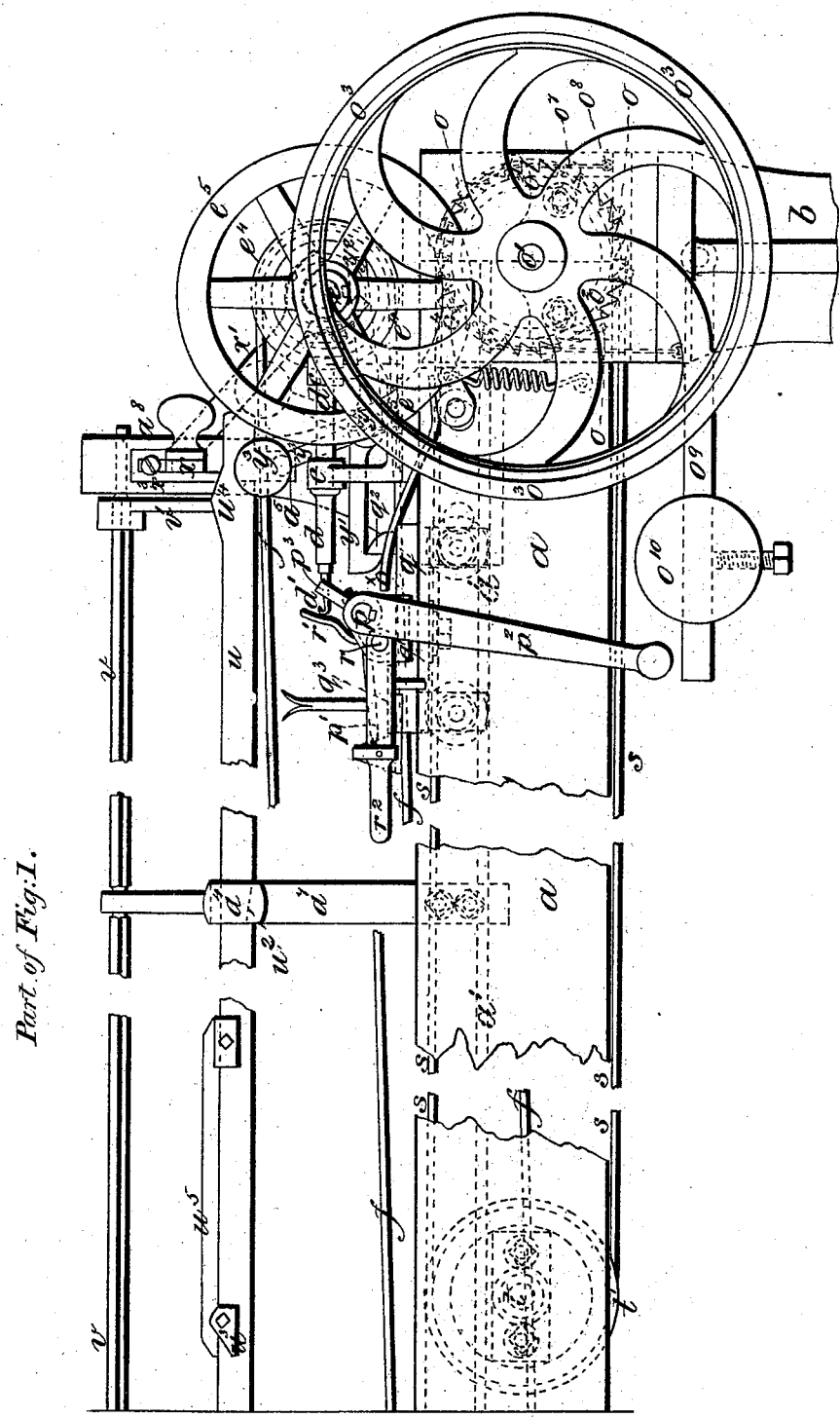

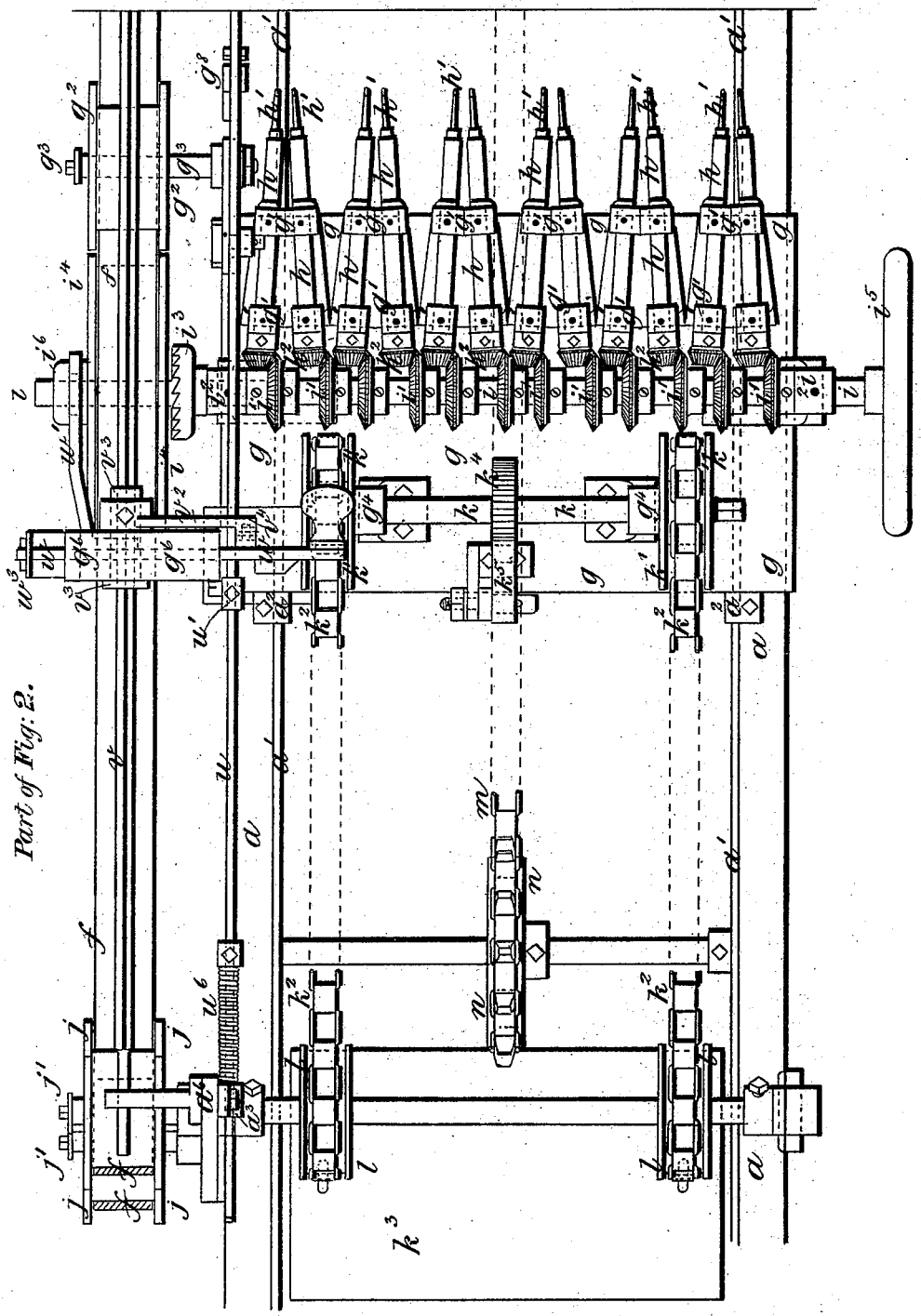

5 Sheets—Sheet 4.
L. BINNS.
Machine for Manufacturing Bands, Cords or Ropes.
No. 209,106. Patented Oct. 22, 1878.
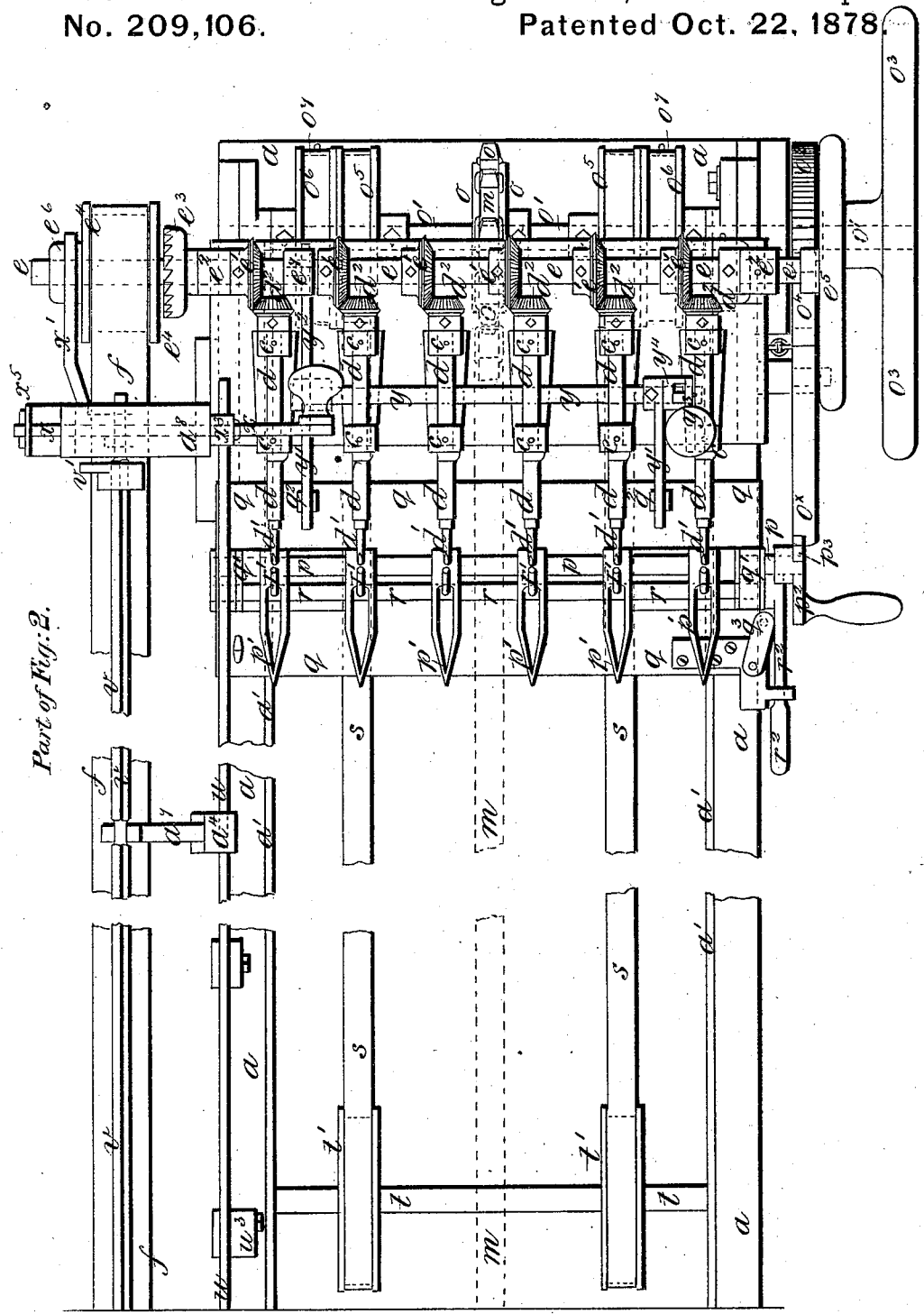
Part of Fig. 2.
Witnesses
Chas J Gooch
A H Salt
Inventor
Leedham Binns
By Knight Bros
Attorneys L. BINNS.
Machine for Manufacturing Bands, Cords or Ropes.
No. 209,106. Patented Oct. 22, 1878.

UNITED STATES PATENT OFFICE.

LEEDHAM BINNS, OF GROVE HOUSE, OAKENSHAW, LOW MOOR, NEAR BRADFORD, ENGLAND.

IMPROVEMENT IN MACHINES FOR MANUFACTURING BANDS, CORDS, OR ROPES.

Specification forming part of Letters Patent No. 209,106, dated October 22, 1878; application filed March 4, 1878; patented in England, June 2, 1877.

*To all whom it may concern:*

Be it known that I, LEEDHAM BINNS, of Grove House, Oakenshaw, Low Moor, near Bradford, in the county of York, England, have invented new and useful Improvements in Machinery or Apparatus Employed in the Manufacture of Bands, Cords, or Ropes, which improvements are fully set forth in the following specification.

The invention has for its object improvements in machinery or apparatus employed in the manufacture of bands, cords, or ropes.

Figure 3:
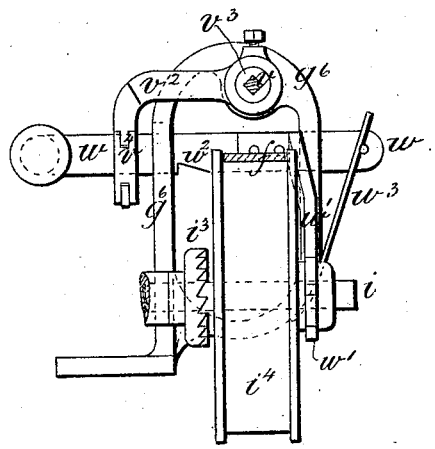
Figure 4:
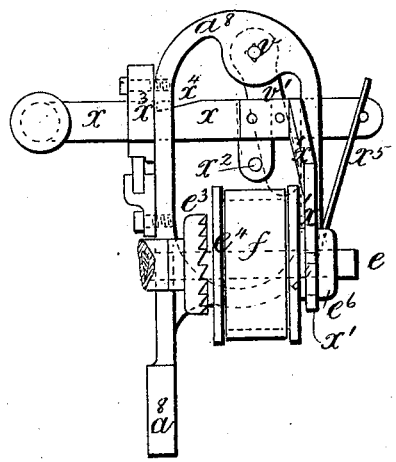

Figure 1 is a side elevation, and Fig. 2 is a plan, of my improved machinery or apparatus, and Fig. 3 is a sectional end elevation of some of the parts thereof on the line 1 1 of Fig. 1; and Fig. 4 is an end elevation of parts.

$a$ is the bed or framing of the machine, which is supported on suitable standards $b$. This bed or framing $a$ may be of any required length; and at the right-hand end thereof I mount in suitable fixed bearings $c$ any desired number of spindles, $d$. These spindles $d$ (one for each band, cord, or rope) are each provided at one end with a hook, $d^1$, and at the other end with a bevel-toothed pinion, $d^2$, which is taken into by and receives motion from a bevel-toothed wheel, $e^1$, fixed on the shaft $e$, capable of rotating in fixed bearings $e^2$. This shaft $e$ has fixed thereon at or near one end a clutch, $e^3$, and has mounted loosely thereon a drum or pulley, $e^4$, which is constantly rotated by the driving strap or band $f$, but which is at the required times thrown into or out of gear with the clutch $e^3$, according as it is required that the aforesaid spindles should rotate or remain stationary. At the other end of this shaft $e$ is fixed a hand-wheel, $e^5$, by which it can, when required, be turned by hand. In or upon suitable guides or ways $a^1$, formed or fixed on the bed or framing $a$ of the machine, I mount a traveling bed or saddle, $g$, which, on commencing to make bands, cords, or ropes on the machine, occupies its extreme position toward the left-hand end of the bed or framing $a$ against fixed stops $a^2$, capable of adjustment on the latter according to the length of cord, rope, or band it is desired for the time being to produce on the machine.

In bearings $g^1$, fixed on the said traveling bed or saddle $g$, I mount a number of rotating spindles, $h$, in pairs, one pair for each band, cord, or rope. These spindles $h$ are provided at one end with hooks $h^1$, and at the other end with bevel-toothed pinions $h^2$, which are taken into by and receive motion from bevel-toothed wheels $i^1$, fixed on a shaft or axis, $i$, capable of rotating in bearings $i^2$ fixed to the traveling bed or saddle $g$. The shaft or axis $i$ has fixed thereon, at or near one end thereof, a clutch, $i^3$, and has mounted loosely thereon a drum or pulley, $i^4$, which is constantly rotated by the driving strap or band $f$, but which is at the required times thrown into or out of gear with the clutch $i^3$, according as it is required that the aforesaid spindles $h$ should rotate or remain stationary. At the other end of this shaft or axis $i$ is fixed a hand-wheel, $i^5$, by which it can, when required, be rotated by hand.

The driving band or strap $f$ passes from the drum or pulley on the mill-shaft (not shown) partly around two guiding drums or pulleys, $j$, mounted on studs or axes of motion $j'$ fixed at the left-hand end of the bed or frame. From the upper of such guiding drums or pulleys $j$ the driving strap or band $f$ passes to and partly around the driving drum or pulley $i^4$, carried by the traveling bed or saddle $g$, and thence partly around a guiding drum or pulley, $g^2$, mounted on a stud or axis, $g^3$, also carried by the traveling bed or saddle $g$. It is thence carried partly around the driving drum or pulley $e^4$, fixed on the spindle-driving shaft or axis $e$, and thence returns to the lower guiding drum or pulley, $j$, whence it returns to the drum or pulley on the mill-shaft. By these means the driving-shaft $i$, carried by the traveling bed or saddle $g$, is capable of being rotated during the motion of such traveling bed or saddle $g$.

The spindles $h$, carried by the traveling bed or saddle $g$, are not mounted parallel to each other; but the spindles of each pair converge toward each other at the hooked ends thereof, so as to bring the hooks $h^1$ of each pair near to each other. This traveling bed or saddle $g$ has also mounted thereon, in bearings $g^4$, a shaft or axis, $k$, which is provided with one or a pair of drums or pulleys, $k^1$, on each of which a chain, $k^2$, or its equivalent, is fixed and wound. These chains $k^2$, or their equivalents, thence pass partly around one or two guide-pulleys, $l$, to a weight, $k^3$, which acts to draw the said traveling bed or saddle $g$ back to its stops $a^2$ when required, and also to put the required strain on the cords, bands, or ropes during the twisting thereof. The shaft or axis $k$ has also mounted thereon a ratchet-wheel, $k^4$, which acts in combination with a stop or catch, $k^5$, so as to permit the unwound portion of the chain or chains $k^2$, or their equivalents, being adjusted in length according to the length of band, cord, or rope it is desired to make in the machine. An endless chain, $m$, of any suitable construction, fixed to the under side of the said traveling bed or saddle $g$, passes around suitable driving pulleys or wheels $n$ $o$, one at or near each end of the main framing or bed of the machine. The chain-driving pulley $o$ at the right-hand end of the machine is fixed to a shaft or axis, $o^1$, on which is fixed a ratchet-wheel, $o^2$, and a hand-wheel, $o^3$, which may also be used as a brake-wheel. A catch or stop, $o^4$, is used in connection with the ratchet-wheel $o^2$, to prevent the traveling bed or saddle $g$ being pulled back by the weight $k^3$ when the finished bands, cords, or ropes are liberated or removed from the hooks; but after the finished bands, cords, or ropes are removed from both sets of hooks $d^1$ $h^1$, the catch or stop $o^4$ can be lifted from the ratchet-wheel $o^2$, and by using the hand as a brake on the hand or brake wheel $o^3$ the weight $k^3$ can be allowed to take the traveling bed or saddle $g$ gradually back until it arrives against the fixed stops $a^2$. If desired, a mechanical brake can be applied to said hand or brake wheel $o^3$.

A shaft or axis, $p$, mounted in bearings formed in blocks $q^1$ carried by a second traveling bed or saddle, $q$, is provided with a number of pointed fingers, $p^1$, and another shaft or axis, $r$, mounted in bearings also formed in the blocks $q^1$ carried by such second traveling bed or saddle $q$, is provided with a number of dividing-wires, $r^1$, capable of passing through openings in the fingers $p^1$, so as to permit of the fingers $p^1$ and dividing-wires $r^1$ being moved independently of each other. To the under side of this second traveling bed or saddle $q$ are fixed two endless straps or bands, $s$, or their equivalents, which thence pass partly around two guide and tension pulleys, $t'$, fixed on a shaft or axis, $t$, near the left-hand end of the main framing or bed $a$, and partly around guide-pulleys $o^5$ mounted loosely on the axis $o^1$ at the right-hand end of the machine on which the chain-wheel $o$ is fixed. These guide-pulleys $o^5$ are capable of revolving freely on their axis $o^1$ in one direction, but have a regulated brake or friction applied thereto in the contrary direction. This is effected in the following manner: On the axis $o^1$ are mounted two friction drums or pulleys, $o^6$, over each of which is passed a friction-band, $o^7$, which at one end is fixed to an eye or hook, $o^8$, and at the other is connected to a weighted lever, $o^9$, the weight $o^{10}$ of which is capable of being regulated in position as shown. The friction drums or pulleys $o^6$ are provided internally with ratchet-wheels, (not shown,) and the guide-pulleys $o^5$ are provided internally with catches, (not shown,) which in one direction slip over the teeth of the last-mentioned ratchet-wheels, but in the other direction engage therewith.

The axis $p$, carrying the pointed fingers $p^1$, has a handle, $p^2$, fixed thereon, and the axis $r$, carrying the dividing-wires $r^1$, has a handle, $r^2$, fixed thereon, by which handles such shafts or axes $p$ $r$ can be operated, and the handle $p^2$ has a projection, $p^3$, which, by acting on the tail $o^\times$ of the catch or stop $o^4$, can, when the pointed fingers $p^1$ are being operated, cause the catch or stop $o^4$ to be liberated from the ratchet-wheel $o^2$, so as to prevent the chain $m$ setting up the traveling bed or saddle $g$ while the fingers $p^1$ are being operated, and thus prevent the slackening of the bands, cords, or ropes on the hooks $d^1$ $h^1$, as would otherwise be the case consequent on the action of the fingers $p^1$. $q^3$ is a movable support, by which the lever $p^2$ can be retained in a raised position when required.

A slide rod or bar, $u$, mounted in guides $a^3$ $g^5$ $a^4$ $a^5$ carried by the standards $a^6$ $g^6$ $a^7$ $a^8$, and a shaft or axis, $v$, mounted in suitable bearings carried by the standards $a^6$ $g^6$ $a^7$ $a^8$, extend from nearly end to end of the machine, for the purposes hereinafter mentioned, and a cross-slide rod, $w$, mounted in suitable guides carried by the standard $g^6$ fixed to the traveling bed or saddle $g$, is employed to throw the left-hand spindle-driving wheel $i^4$ into and out of connection with its clutch $i^3$ at the times required by means of a forked arm, $w^1$, fixed to such rod $w$, acting within the groove of the boss $i^6$ of the wheel $i^4$, to slide the latter on its axis $i$, and a similar cross-slide rod or bar, $x$, is employed to throw the spindle-driving wheel $e^4$ into and out of connection with its clutch $e^3$ at the times required by means of a forked arm, $x^1$, fixed to such rod $x$, acting within a groove in the boss $e^6$ of the wheel $e^4$, to slide the latter on its axis $e$.

The longitudinal sliding rod or bar $u$ is provided with a suitable adjustable collar or projection, $u^1$, catch or stop $u^2$, and with inclines $u^3$ and $u^4$, and the longitudinal shaft or axis $v$, which is formed square except where it revolves in its bearings, has fixed on one end thereof a lever, $v^1$, while a lever, $v^2$, capable of sliding thereon, but at the same time of giving motion thereto, is mounted and caused to travel thereon in the following manner: A boss, $v^3$, provided with a square hole to fit easily the shaft $v$, and turned on the outside, is mounted in a bearing formed for it in the standard $g^6$. This boss $v^3$ is provided with a flange at one end to abut against one side of the standard $g^6$, and on the other end of the boss $v^3$, which projects beyond the bearing, the lever $v^2$ is fixed. A hinged piece, $v^4$, connected to the lever $v^2$, and provided with a roller at its lower end, is acted upon in the one direction by an incline, $w^3$, on the longitudinal sliding bar or rod $u$, to raise that end of the lever $v^2$, and thereby give a partial rotary motion to the longitudinal shaft or axis $v$, which, by causing the lever $v^1$ to act upon a stud or projection, $x^2$, carried by the cross-slide bar or rod $x$, moves the latter in one direction, so as to throw the wheel $e^4$ into gear with the clutch $e^3$, and thereby give rotary motion to the spindles $d$.

A lever, $g^8$, mounted on an axis, $g^7$, carried by the traveling bed or saddle $g$, and provided with an adjustable roller, $g^9$, is acted upon by an incline formed on one of the blocks $q^1$ carried by the traveling bed to raise and thereby liberate the catch or stop $u^2$ of the longitudinal sliding rod or bar $u$ from the corresponding catch on the standard $a^7$, which rod or bar $u$, in rising by the part $u^5$, liberates the catch $w^2$ of the cross-slide rod or bar $w$ from its corresponding catch on the standard $g^6$, and in sliding toward the right hand the longitudinal bar $u$, by means of the incline $u^4$, also liberates a sliding catch, $x^3$, from a corresponding catch, $x^4$, on the cross-slide bar or rod $x$, and, aided by springs $w^3$ $x^5$, such cross-bars $w$ $x$ are caused to throw the driving-wheels $i^4$ $e^4$ out of gear with their clutches $i^3$ $e^3$, and thereby stop the motions of the machine.

A spring, $u^6$, acts to move the longitudinal slide-rod $u$ in the one direction, while it is moved in the contrary direction by means of the standard $g^6$ on the traveling bed $g$ acting on a collar or projection, $u^1$, on such longitudinal slide-bar $u$ in the return motion of such traveling bed $g$.

Catches $y^1$ $y^1$ fixed to a shaft, $y$, are employed, in combination with catches or projections $q^2$, to hold the traveling bed $q$ firmly in position at the right-hand end of the machine, and one of such catches has a tail-piece, $y^2$, provided with a nib or projection to fit a corresponding recess in the wheel or boss $e^7$ fixed on the shaft $e$, so that when the catches $y^1$ are in position to hold the traveling bed $q$ the nib or projection on the tail-piece $y^2$ shall, by lying in the recess in the wheel or boss $e^7$, prevent the possibility of the shaft $e$ being rotated.

A weighted arm or lever, $y^3$, mounted loosely on the shaft or axis $y$, is provided with a projection, which acts in combination with a larger recess formed in the boss $y^4$, so that by throwing such weighted lever $y^3$ over to the one side or other of the vertical position it shall retain the catches $y^1$ in the position shown in the drawings, or in a position raised out of the way of the catches or projections $q^2$. By regulating the position of the parts $u^1$, $u^3$, $u^5$, and $a^2$, and by regulating the length of the unwound portions of the chains $k^2$, the machinery or apparatus can be adjusted so as to produce any length of cord, band, or rope within the limits thereof.

In proceeding to manufacture bands, cords, or ropes by the aid of machinery or apparatus constructed as above described, I first place the dividing-wires $r^1$ in their vertical position and the fingers $p^1$ in their horizontal position, as shown in the drawings. I then take a strand of material from a reel or bobbin (not shown) and pass or hook it in succession partly around, say, a single hook, $d^1$, at the right hand. I then pass or hook it onto one of a pair of hooks, $h^1$—say No. 1—carried by the traveling bed or saddle $g$. I then carry it back and hook it again onto the single hook $d^1$, and then return with it and hook it on, say, No. 2 hook of a pair of hooks, $h^1$. I again carry it back to the single hook, and repeat the operations as often as required to form a doubled hank of the substance required for the band, cord, or rope. The doubled hank thus formed will resemble an ordinary hank doubled at its center, and there hooked onto a hook, $d^1$, and having the two ends hooked, the one onto, say, No. 1 hook and the other onto, say, No. 2 hook of a pair of hooks, $h^1$. When all the sets of hooks $d^1$ $h^1$ are thus filled with hanks, and the loose ends of each hank tied together, and the traveling bed $q$ previously secured at the right-hand end of the machine by means of the catches or stops $y^1$, I, by means of a handle on the cross slide-bar $w$, slide the latter in its bearings, so as to throw the spindle-driving wheel $i^4$ into gear with its clutch $i^3$, and thus give rotary motion to the spindles $h$ and hooks $h^1$, so as to twist each part of each doubled hank. As the hanks become shorter by reason of the twist put therein the traveling bed $g$ is caused by them to move gradually toward the right hand, a suitable strain being put on the hanks by the action of the weight $k^3$, and, when the hanks have been twisted a sufficient amount by means of these hooks, I raise the fingers $p^1$ to cause them to pass between the two parts of each hank, and thus cause the twist to pass into the part held by the single hook $d^1$. The traveling bed or saddle $q$ is then liberated from the catches or stops $y^1$, and the right-hand spindles $d$ and hooks $d^1$ are then thrown into action by means of the incline $u^3$, lever $v^2$, shaft $v$, and lever $v^1$ acting upon the slide-rod $x$ to throw the driving-wheel $e^4$ into gear with its clutch $e^3$. The rotary motion of both sets of hooks $d^1$ $h^1$ is continued until the completion of the cord, band, or rope. As the doubled hank is thus being twisted by the spindles $d$ the twisted portion acts upon the dividing-wires $r^1$, and causes the traveling bed or saddle $q$ to move forward toward the left hand until it arrives against the traveling bed or saddle $g$, when the parts are automatically thrown out of action by the incline $q^1$ acting upon the lever $g^8$ to raise and liberate the rod or bar $u$, and thereby liberate the cross-slide rods $w$ and $x$, as hereinbefore described. The dividing-wires $r^1$ are then depressed, so as to remove them from between the two parts of each cord, band, or rope, after which the traveling beds $g$ $q$ are both run a short distance toward the right hand, in order to slacken the bands, cords, or ropes, to enable them to be readily removed from the hooks $d^1$ $h^1$, after which the traveling beds $g$ $q$ are run back to their starting positions, and the operations are repeated as before.

By varying the weight $k^3$, acting on the traveling bed $g$, the degree of twist put on the bands, cords, or ropes can be varied, as may be required.

It will be evident that various modifications may be made in the means for giving motion to the spindles $d$ $h$ and other parts, and for automatically throwing the various parts into and out of action, without departing from the peculiar character of my invention; and I would remark that, if desired, the hanks may be formed in other ways than that herein described, and may then be placed on the hooks $d^1$ $h^1$, and more than two spindles and hooks may be arranged in a set for each cord, rope, or band on the traveling bed $g$, thereby enabling me to form a rope, band, or cord, within certain limits, of as many twisted strands as may be desired.

Having thus described the nature of my said invention, and the mode in which I carry the same into effect, I would have it understood that what I claim is—

1. The spindles $d$ and $h$, carrying at one end the hooks $d^1$ and $h^1$, the other end having the bevel-toothed pinions $d^2$ and $h^2$, engaging with similar gears on their respective shafts at the two ends of the machine, in combination with the driving-shafts $e$ $i$, having thereon the clutches $e^3$ $i^3$ and drum or pulley $e^4$ $i^4$, for actuating the spindles through said toothed pinion and throwing the hooks $d^1$ $h^1$ into and out of operation, substantially as set forth.

2. The combination, with the shafts $p$ and $r$, of the fingers $p^1$ and dividing-wires $r^1$, the fingers having openings near their ends, through which the wires may pass to secure the independent movement of said fingers and wires, substantially as set forth.

3. The combination, in a machine for manufacturing bands, cords, or ropes, of the spindles $d$ $h$, hooks $d^1$ $h^1$, slotted fingers $p$, and wires $r^1$, arranged and operated substantially as and for the purpose set forth.

LEEDHAM BINNS.

Witnesses:
  DALTON RICHLEY,
    *Oak Mills, Low Moor.*
  ABM. GREENWOOD,
    *Oak Mills, Low Moor.*